United States Patent
Miyauchi et al.

(10) Patent No.: US 7,504,168 B2
(45) Date of Patent: Mar. 17, 2009

(54) SYSTEMS FOR CONTROLLING OPERATION OF A FUEL CELL ELECTRICITY GENERATING SYSTEM RESPONSIVE TO DETECTION OF ABNORMALITIES

(75) Inventors: Shinji Miyauchi, Nara (JP); Tetsuya Ueda, Aichi (JP); Terumaru Harada, Nara (JP); Masataka Ozeki, Osaka (JP); Masao Yamamoto, Osaka (JP); Akinari Nakamura, Osaka (JP); Yoshikazu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 10/482,083

(22) PCT Filed: Mar. 18, 2003

(86) PCT No.: PCT/JP03/03186

§ 371 (c)(1),
(2), (4) Date: Jul. 21, 2004

(87) PCT Pub. No.: WO03/079478

PCT Pub. Date: Sep. 25, 2003

(65) Prior Publication Data

US 2004/0241510 A1 Dec. 2, 2004

(30) Foreign Application Priority Data

Mar. 19, 2002 (JP) ............................. 2002-077004

(51) Int. Cl.
*H01M 8/04* (2006.01)
*H01M 8/12* (2006.01)
*H01M 8/00* (2006.01)

(52) U.S. Cl. ............................. 429/24; 429/22; 429/26; 429/13

(58) Field of Classification Search ................... 429/20, 429/24, 26, 22
See application file for complete search history.

(56) References Cited

U.S. PATENT DOCUMENTS 6,247,919 B1  6/2001  Welz, Jr. et al.

(Continued)

FOREIGN PATENT DOCUMENTS

EP  1 081 779 A1  3/2001

(Continued)

OTHER PUBLICATIONS

Supplementary European Search Report for EP 03 71 2724, dated Aug. 8, 2007.

(Continued)

*Primary Examiner*—Dah-Wei D Yuan
*Assistant Examiner*—Zachary Best
(74) *Attorney, Agent, or Firm*—RatnerPrestia

(57) ABSTRACT

It has heretofore been practiced upon the occurrence of abnormalities on the equipment to make tentative conditioned operation disregarding abnormalities on the assumption that the abnormalities shall be coped with by servicemen. Thus, troubles having insignificant contents of abnormality could not be readily coped with by a simple method. There are provided a fuel cell, a fuel gas supplying unit, an oxidizer gas supplying unit, a state detecting unit of detecting the temperature of the fuel gas supplying unit, an operation controlling unit of detecting abnormalities of predetermined functions performed by the fuel gas supplying unit utilizing the results detected by the state detecting unit and performing operation control in an operation mode corresponding to the contents of abnormalities, and an operation mode switching unit of switching to an operation mode corresponding to the contents of abnormalities.

7 Claims, 6 Drawing Sheets

U.S. PATENT DOCUMENTS 6,835,481 B2 * 12/2004 Dickman et al. .............. 429/19

FOREIGN PATENT DOCUMENTS

| EP | 1 122 805 A2 |   | 8/2001  |
|----|--------------|---|---------|
| JP | 5-3043 A     |   | 1/1993  |
| JP | 7-294001     |   | 11/1995 |
| JP | 2000285942 A | * | 10/2000 |
| JP | 2002-25591 A |   | 1/2002  |
| JP | 2002-100389 A |  | 4/2002  |
| JP | 2002-274805 A |  | 9/2002  |

OTHER PUBLICATIONS

International Search Report for PCT Application No. PCT/JP03/013186 with English translation of Form PCT/ISA/210.

* cited by examiner

US 7,504,168 B2

SYSTEMS FOR CONTROLLING OPERATION OF A FUEL CELL ELECTRICITY GENERATING SYSTEM RESPONSIVE TO DETECTION OF ABNORMALITIES

THIS APPLICATION IS A U.S. NATIONAL PHASE APPLICATION OF PCT INTERNATIONAL APPLICATION PCT/JP03/03186.

TECHNICAL FIELD

The present invention relates to a fuel cell electricity generating system and fuel cell electricity generating system controlling method using a fuel cell.

BACKGROUND ART

Methods of operating the related art combustion devices, etc. during the occurrence of abnormalities are disclosed in JP-A-7-294001, etc. The entire disclosure of JP-A-7-294001 is incorporated (referenced) herein by reference.

FIG. 5 illustrates the configuration of a hot water supplier (JP-A-7-294001) as related art example 1. In FIG. 5, the hot water supplier is provided with detectors 6, 7 provided in a water circuit of controlling a heater 5. An operator 8 switches the operation of the heater 5 ON/Off and predetermines the temperature of hot water to be supplied from a hot water port 2. A controller 9 controls the generated amount of heat and provides starting/suspension of the heater 5 on the basis of data from the detectors 6, 7 and-predetermination by the controller 8. A sub-controller 14 controls the heater 5 by a predetermined amount of control regardless of data from the detectors 6, 7 and predetermination by the controller 8. A manually-operated selector 15 selects either the controller 9 or the sub-controller 14. An abnormality controller 13 switches the operation of the heater 5 OFF in preference to the controller 9 when data from the detector 6 deviates from a predetermined range. An unsafety detector 10 provides, separate and independent of the detector 6, detection of unsafe states such as abnormal temperature rise A protector 12 unconditionally suspends operation of the heater 5 in preference to all the controllers on the basis of a signal from the unsafety detector 10 and is arranged such that when the abnormality controller 13 operates to switch the operation of the heater 5 OFF, the operation of the selector 15 allows manual switching of control over the heater 5 from the controller 9 to the sub-controller 14.

FIG. 6 indicates the configuration of an electricity generation system using a fuel cell as related art example 2. In FIG. 6, the reference numeral 21 indicates a fuel cell, and a fuel gas supplying unit 22 performs water vapor modification of a raw material such as natural gas to produce a gas mainly composed of hydrogen which is then supplied into the fuel cell 21. The fuel gas supplying unit 22 is provided with a modifier 23 of producing a modified gas and a carbon monoxide transformer 24 of allowing the reaction of carbon monoxide contained in the modified gas with water to produce carbon dioxide and hydrogen. In a fuel side humidifier 25, a fuel gas to be supplied into the fuel cell 21 is humidified. The reference numeral 26 indicates an air supplier which supplies air as an oxidizer into the fuel cell 21. During this procedure, air to be supplied is humidified in an oxidizing side humidifier 27. There are further provided a cooling pipe 28 of feeding water to the fuel cell 21 to cool the fuel cell 21 and a pump 29 of circulating water in the cooling pipe.

Further, connection is arranged such that waste heat generated by the electricity generation by the fuel cell 21 is collected by a heat exchanger 30 and a circulating pump 31 into a hot water storage tank 33 via a waste heat collecting pipe 32.

Moreover, during the starting of operation, in order to reduce the starting time of the fuel cell 21, the time required until a temperature range suitable for modification reaction or transformation reaction is reached in a fuel processor 22 is reduced using a heater and a temperature detector (not shown) incorporated in the modifier 23 or the carbon monoxide transformer 24. Also in the path of the cooling pipe 28, the time required until a temperature range suitable for electricity generation reaction is reached is similarly reduced using a heater of heating cooling water or a temperature detector (not shown).

The hot water supplier according to the aforementioned related art example 1 (FIG. 5) is arranged such that when any trouble on the detector causes the hot water supplier to be suspended, the manufacturer or distributor confirms safety and operates the selector to switch control over the heater from the controller to the sub-controller so that the heater is forced to operate by a predetermined amount regardless of troubles in the detector. Thus, since trouble in the detector of detecting control data are targeted as abnormalities, the range of abnormalities that can be coped with is limited. Further, the aforementioned example is arranged such that the selector is manually operated to switch the control over the heater to the sub-controller on the assumption that the switching operation shall be attended by the manufacturer or distributor upon the occurrence of abnormalities, making it impossible to quickly cope with troubles having insignificant contents of abnormality by a simple method.

Further, the fuel cell electricity generating system according to the aforementioned related art example 2 (FIG. 6) is disadvantageous in that when the modifier 23 of reducing the starting time of the fuel cell 21 or the heat incorporated in the carbon monoxide transformer 24 undergoes troubles or abnormalities, the fuel cell electricity generating system cannot but wait for repair after emergency suspension.

Further, the fuel cell electricity generating system according to the aforementioned related art example 2(FIG. 6) is disadvantageous in that when the heater for heating cooling water in the path of the cooling pipe 28 for reducing the starting time of the fuel cell 21 undergoes troubles or abnormalities, the fuel cell electricity generating system cannot but wait for repair after emergency suspension.

Further, the fuel cell electricity generating system according to the aforementioned related art example 2(FIG. 6) is disadvantageous in that when the temperature detector of the fuel cell 21, etc. undergo troubles or abnormalities, the fuel cell electricity generating system cannot but wait for repair after emergency suspension.

DISCLOSURE OF THE INVENTION

An aim of the present invention is to solve the aforementioned problems with the related art and provide a high reliability fuel cell electricity generating system and fuel cell electricity generating system controlling method which can cope with troubles having insignificant contents of abnormality by a predetermined substitute method during the occurrence of abnormalities to resume operation.

To solve the above problem, a first aspect of the present invention is a fuel cell electricity generating system comprising a fuel cell of allowing the reaction of a fuel gas with an oxidizer gas to generate electricity, a fuel gas supplying unit of supplying said fuel gas into said fuel cell, an oxidizer gas supplying unit of supplying said oxidizer gas into said fuel cell a state detecting unit (42) of detecting the temperature of said fuel gas supplying unit an operation controlling unit of detecting abnormalities of predetermined functions performed by said fuel gas supplying unit utilizing the results detected by said state detecting unit and performing operation control in an operation mode corresponding to the contents of abnormalities and an operation mode switching unit of switching to an operation mode corresponding to the contents of abnormalities, wherein said operation mode corresponding to the contents of abnormalities allows the use of a function of treating a predetermined control temperature attainment time estimated by the heat conduction of a modifier and a modified gas included in said fuel gas supplying unit as limited time during starting in substitution for a function of transforming heater of heating a transforming unit included in said fuel gas supplying unit before starting.

Further, a second aspect of the present invention is the fuel cell electricity generating system according to the first of the present invention, wherein said predetermined control temperature attainment time is longer than the time required until the control temperature is reached from starting on determined temperature rise characteristics of said transforming unit which has not previously been heated by said transforming heater.

Moreover, the third aspect of the present invention lies in a fuel cell electricity generating system, comprising:

a fuel cell of allowing the reaction of a fuel gas with an oxidizer gas to generate electricity, a fuel gas supplying unit of supplying said fuel gas into said fuel cell, an oxidizer gas supplying unit of supplying said oxidizer gas into said fuel cell a state detecting unit of detecting the temperature of cooling water to be supplied into said fuel cell, an operation controlling unit of detecting abnormalities of predetermined functions performed by said fuel cell utilizing the results detected by said state detecting unit and performing operation control in an operation mode corresponding to the contents of abnormalities, an operation mode switching unit of switching to an operation mode corresponding to the contents of abnormalities and a hot water storage tank using heat generated by said fuel cell wherein said operation mode corresponding to the contents of abnormalities allows the use of a function of heating cooling water by the heat of hot water of said hot water storage tank in substitution for a function of a cooling water heater of heating said cooling water to said fuel cell before starting.

Further, the fourth aspect of the present invention lies in a fuel cell electricity generating system, comprising:

a fuel cell of allowing the reaction of a fuel gas with an oxidizer gas to generate electricity, a fuel gas supplying unit of supplying said fuel gas into said fuel cell an oxidizer gas supplying unit of supplying said oxidizer gas into said fuel cell state detecting units of detecting the temperature of said fuel gas supplying an operation controlling unit of detecting abnormalities of said state detecting units themselves utilizing the results detected by said state detecting units and performing operation control in an operation mode corresponding to the contents of abnormalities and an operation mode switching unit of switching to an operation mode corresponding to the contents of abnormalities.

Moreover, the fifth aspect of the present invention lies in the fuel cell electricity generating system of the fourth aspect wherein said operation mode corresponding to the contents of abnormalities allows the use of predetermined other state detecting units in substitution for the state detecting units which have undergone abnormalities.

Further, the sixth aspect of the present invention lies in the fuel cell electricity generating system of the fifth aspect wherein said state detecting unit which has undergone abnormalities is a combustion fan suction temperature detecting unit of detecting the temperature of combustion air to be fed into a heating unit included in said fuel gas supplying unit and said state detecting unit to be used in substitution for said state detecting unit which has undergone abnormalities is a gas temperature detecting unit of detecting the temperature of a raw material gas to be fed into said fuel gas supplying unit.

Moreover, the seventh aspect of the present invention lies in the fuel cell electricity generating system of the fifth aspect wherein said state detecting unit which has undergone abnormalities is a gas temperature detecting unit of detecting the temperature of a raw material gas to be fed into said fuel gas supplying unit and said state detecting unit to be used in substitution for said state detecting unit which has undergone abnormalities is a combustion fan suction temperature detecting unit of detecting the temperature of combustion air to be fed into a heating unit included in said fuel gas supplying unit.

Further, the eighth aspect of the present invention lies in the fuel cell electricity generating system of any one of the first to seventh aspect wherein said operation mode switching unit performs switching operation by remote-controlled switches in a predetermined order and combination to execute switching.

Moreover, the ninth aspect of the invention lies in the fuel cell electricity generating system of any one of the first to seventh aspects wherein said operation mode switching unit performs remote-controlled switching so that the fuel cell electricity generating system is operated according to an operation program corresponding to the contents of abnormalities transmitted by an outdoor maintenance controlling unit via a communications unit.

Moreover, the ninth aspect of the invention lies in the fuel cell electricity generating system of any one of the first to seventh aspects wherein said operation mode switching unit performs remote-controlled switching so that the fuel cell electricity generating system is operated according to an operation program corresponding to the contents of abnormalities transmitted by an outdoor maintenance controlling unit via a communications unit.

Further, the tenth aspect of the present invention lies in a fuel cell electricity generating system controlling method of controlling a fuel cell electricity generating system comprising a fuel cell of allowing the reaction of a fuel gas with an oxidizer gas to generate electricity, a fuel gas supplying unit of supplying said fuel gas into said fuel cell and an oxidizer gas supplying unit of supplying said oxidizer gas into said fuel cell, which comprises:

a state detecting step of detecting the temperature of said fuel gas supplying unit;

an operation controlling step of detecting abnormalities of predetermined functions performed by said fuel gas supplying unit utilizing the results detected at said state detecting step and performing operation control in an operation mode corresponding to the contents of abnormalities; and an operation mode switching step of switching to an operation mode corresponding to the contents of abnormalities, wherein said operation mode corresponding to the contents of abnormalities allows the use of a function of treating a pre-determined control temperature attainment time estimated by the heat conduction of a modifier and a modified gas included in said fuel gas supplying unit as limited time during starting in substitution for a function of transforming heater of heating a transforming unit included in said fuel gas supplying unit before starting.

Moreover, the eleventh aspect of the present invention lies in a fuel cell electricity generating system controlling method of controlling a fuel cell electricity generating system comprising a fuel cell of allowing the reaction of a fuel gas with an oxidizer gas to generate electricity, a fuel gas supplying unit of supplying said fuel gas into said fuel cell, an oxidizer gas supplying unit of supplying said oxidizer gas into said fuel cell and a hot water storage tank using heat generated by said fuel cell, which comprises:

a state detecting step of detecting the temperature of said fuel cell;

an operation controlling step of detecting abnormalities of predetermined functions performed by said fuel cell utilizing the results detected at said state detecting step and performing operation control in an operation mode corresponding to the contents of abnormalities; and an operation mode switching step of switching to an operation mode corresponding to the contents of abnormalities, wherein said operation mode corresponding to the contents of abnormalities allows the use of a function of heating cooling water by the heat of hot water of said hot water storage tank in substitution for a function of a cooling water heater of heating said cooling water to said fuel cell before starting.

Further, the twelfth aspect of the invention lies in a fuel cell electricity generating system controlling method of controlling a fuel cell electricity generating system comprising a fuel cell of allowing the reaction of a fuel gas with an oxidizer gas to generate electricity, a fuel gas supplying unit of supplying said fuel gas into said fuel cell and an oxidizer gas supplying unit of supplying said oxidizer gas into said fuel cell, which comprises:

a state detecting step of detecting the temperature of at least one of said fuel gas supplying unit, oxidizer gas supplying unit and fuel cell;

an operation controlling step of detecting abnormalities of said state detecting step itself utilizing the results detected at said state detecting step and performing operation control in an operation mode corresponding to the contents of abnormalities; and an operation mode switching step of switching to said operation mode corresponding to the contents of abnormalities.

DESCRIPTION OF REFERENCE NUMERALS

Figure 1:
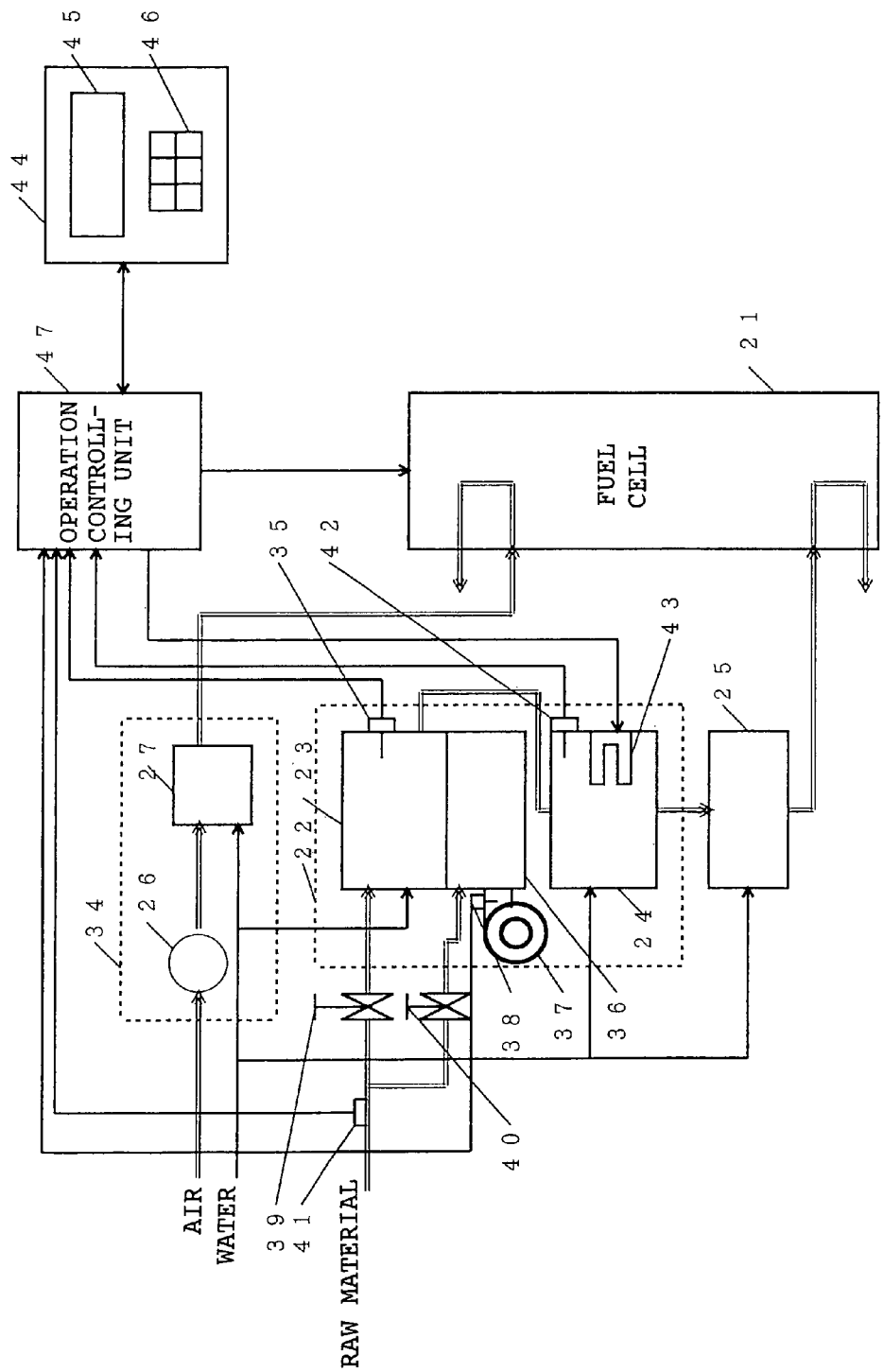
FIG. 1 is a block diagram of the fuel cell electricity generating system according to the embodiments 1 and 2 of the present invention.

21 Fuel cell
22 Fuel gas supplying unit
34 Oxidizer gas supplying unit
35 Modification temperature detecting unit
38 Combustion fan suction temperature detecting unit
41 Gas temperature detecting unit
42 Transformation temperature detecting unit
43 Transforming heater
44 Special operation mode switching unit
47 Operation controlling unit

BEST EMBODIMENT FOR CARRYING OUT THE INVENTION

Embodiments of implementation of the present invention will be described hereinafter in connection with the attached drawings.

Embodiment 1 of the Invention

FIG. 1 is a block diagram of the fuel cell electricity generating system according to the embodiment 1 of the present invention.

Figure 6:
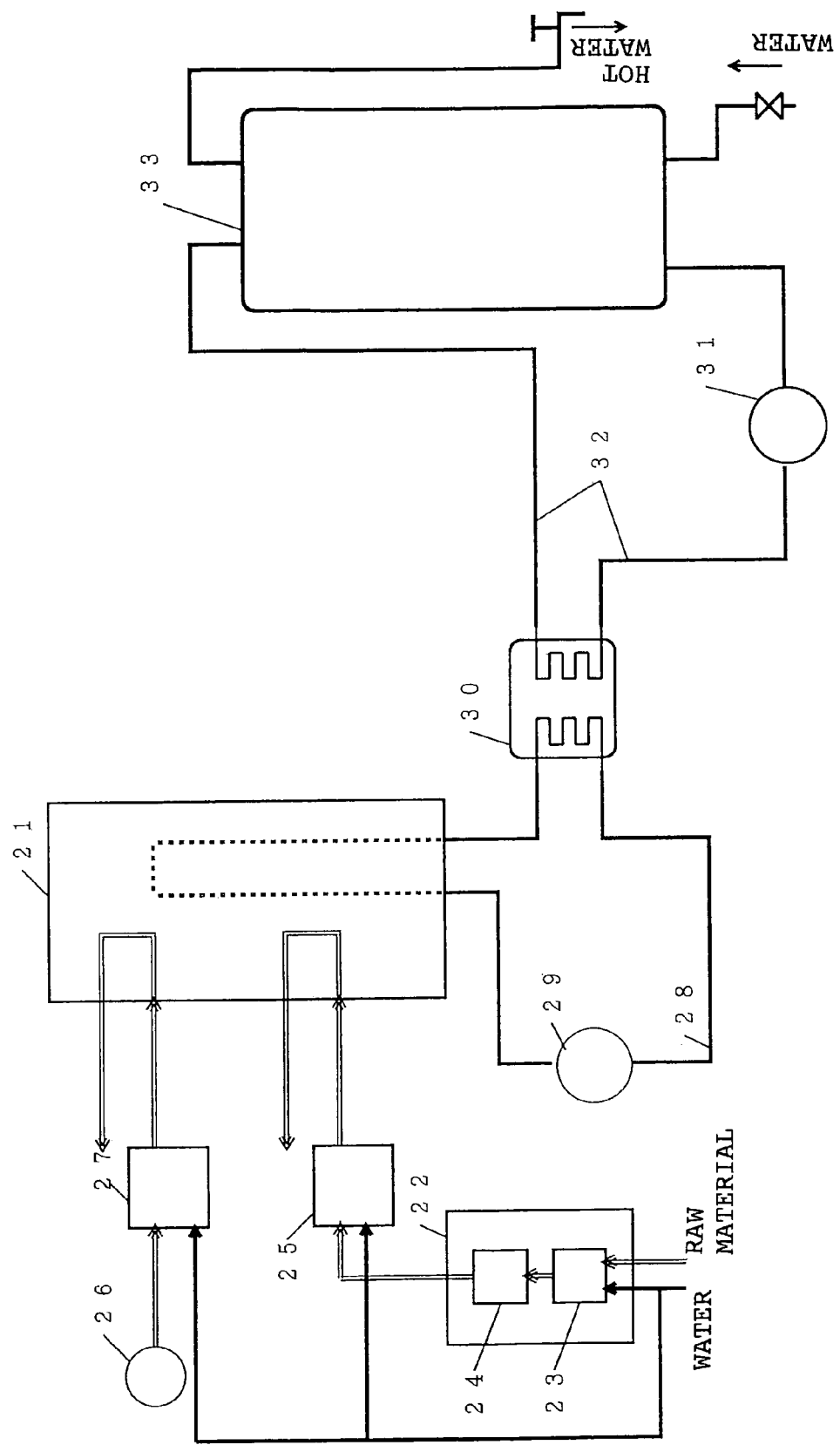
FIG. 6 is a block diagram of the fuel cell electricity generating system according to the related art example 2.

In FIG. 1, where the parts function in the same way as those of the electricity generating system using a related art fuel cell shown in FIG. 6, the same numbers are used and their detailed description will be omitted because they are similar to those of FIG. 6.

The reference numeral 34 indicates an oxidizer gas supplying unit comprising an air supplying unit 26 and an oxidation side humidifier 27 of humidifying the air supplied. A modifier 23 comprises a modification temperature detecting unit 35 of detecting the temperature of the modifier 23, a heating unit 36 of heating a raw material gas and water, a combustion fan 37 of supplying combustion air into the heating unit 36 and a combustion fan suction temperature detecting unit 38 of detecting the temperature of air to be supplied into the combustion fan 37.

Further, the modifier 23 comprises a raw material gas supply valve 39 of supplying a raw material gas, a combustion gas supply valve 40 of supplying a combustion gas into the heating unit 36 and a gas temperature detecting unit 41 of detecting the temperature of the raw material gas and fuel gas. A carbon monoxide transformer (hereinafter referred to as "transformer") 24 comprises a transformation temperature detecting unit 42 of detecting the temperature of the transformer 24 and a transformer heater 4-3 of heating the transformer 24.

The reference numeral 44 indicates a remote controller as a state detecting unit of detecting states such as temperature, flow rate and pressure of the fuel gas supplying unit 22, oxidizer gas supplying unit 34, fuel cell 21, etc. or special operation mode switching unit of switching to a special operation mode after detection of abnormalities of the heater, solenoid valve, motor, etc. and comprises a display portion 45 of displaying operation state and an operating portion 46 of performing switch operation such as operation and suspension.

The reference numeral 47 indicates an operation controlling unit of receiving state detection signal from the state detecting unit in normal operation to drive various units to control operation in a predetermined normal operation mode and detecting abnormalities of predetermined functions of the state detecting unit or various units to perform operation in a special operation mode corresponding to the contents of abnormalities.

The modification temperature detecting unit 35, the combustion fan suction temperature detecting unit 38, the gas temperature detecting unit 41 and the transformation temperature detecting unit 42 are specific examples of the state detecting unit of the present invention of detecting the state of the fuel cell electricity generating system and are formed by, e.g., thermistor, thermocouple, etc. Further, the combustion fan 37, the raw material gas supply valve 139, the combustion gas supply valve 40 and the transformer heater 43 are specific examples of the units generating abnormalities of the present invention.

Next, the operation and action will be described.

While the fuel cell electricity generating system is started or generates electricity, the operation controlling unit 47 allows a raw material such as natural gas and water to be heated via the heating unit 36 in the modifier 23 of the fuel gas supplying unit 22 to cause the water vapor modification of the raw material according to the generated amount of electricity, thereby producing a gas mainly composed of hydrogen which is then supplied into the fuel cell 21. During this procedure, the operation controlling unit 47 allows the temperature of the modifier 23 to be detected by the modifier temperature detecting unit 35 so that the temperature of the modifier 23 is controlled to a predetermined temperature (temperature at which water vapor modification is conducted: about 600° C. to 700° C.) and allows the temperature of raw material gas to be detected by the gas temperature detecting unit 41 so that the amount of the raw material gas supplied through the raw material gas supply valve is temperature-corrected.

Further, the temperature of the combustion air is detected by the combustion fan suction temperature detecting unit 38 so that the amount of the combustion air to be supplied into the heating unit 36 by the combustion fan 37 is temperature-corrected (air density-corrected).

During starting, the operation controlling unit 47 allows the transformer 24 to rise in temperature using a modifier heater 43 to reduce the starting time. The transformation temperature detecting unit 42 controls the temperature of the transformer 24 to a predetermined value (temperature at which transformation reaction is conducted: about 250° C. to 350° C.) so that transformation reaction is conducted to allow carbon monoxide contained in the modified gas to react with water to produce carbon dioxide and hydrogen. The use of the transformer heater 43 accelerates the rise of temperature of the transformer 43, allowing the fuel cell electricity generating system to start in scores of minutes.

Next, in the case where the transformer heater 43 is out of order (break), the transformation temperature detecting unit 42 detects that although the operation controlling unit 47 outputs and drives the transformer heater 43 during starting, the rate of rise of temperature of the transformer is low as compared with that in normal operation. When the predetermined temperature is not reached in a predetermined period of time, the break of the transformer heater 43 is confirmed and displayed as abnormality in the display portion 45 of the remote controller 44, which is an operation mode switching unit, to make emergency suspension.

Thereafter, by making a special operation (e.g., double depression of a plurality of switches on the operation portion 46 or continuous depression of these switches for a predetermined period of time or combination of these operations of depression of switches) on the remote controller 44, the operation mode is switched to a special operation mode for the break of the transformer heater 43. In other words, the operation mode is switched to an operation sequence for the absence of temperature rise by the transformer heater 43.

In the special operation mode for the break of the transformer heater 43, the fuel cell electricity generating system is started without performing the judgment of break of the transformer heater 43 on the assumption made by the transformation temperature detecting unit 42 that the rate of rise of temperature of the transformer during starting is low as compared with that in normal operation. The operation of the fuel cell electricity generating system is allowed to start with a predetermined control temperature attainment time presumed by the heat conduction of the modifier 23 and the modified gas as limited time. The starting time of the fuel cell electricity generating system in the special operation mode or normal operation mode means the time at which heating of the modifier 23 by the heating unit 36 starts.

This predetermined control temperature attainment time is determined as follows. Namely, the characteristics of temperature rise of the modifier 23 of the transformer and the modified gas by heat conduction in the case where heating is not made by the transformer heater 43 have been previously grasped. About 1.2 to 2.0 times the duration from the beginning of the starting of the fuel cell electricity generating system until the starting control temperature (e.g., about 250° C.) which is the lower limit of the temperature range within which the transformation reaction is applied is reached is defined as the predetermined control temperature attainment time. The starting control temperature varies with the catalyst body or the configuration of the apparatus and is not limited to the aforementioned temperature.

Accordingly, in the special operation mode for the break of the transformer heater 43, when the predetermined control temperature attainment time passes from the starting of the fuel cell electricity generating system, the operation control of the fuel cell electricity generating system is started.

Further, about 0.2 to 1.0 times the duration during which the starting control temperature (e.g., about 250 ° C.) is reached from the beginning of starting of the fuel cell electricity generating system is provided as a margin. In other words, this margin is provided in expectation of temperature change as in the case where temperature is lower in the winter than in the summer. In other words, this margin is provided so that the starting control temperature (e.g., about 250 ° C.) can be reached with a sufficient margin even if the temperature is low. The present embodiment has been described with reference to the case where the predetermined control temperature attainment time is defined to be from about 1.2 to 2.0 times the duration during which the starting control temperature (e.g., about 250 ° C.) is reached from the beginning of starting of the fuel cell electricity generating system, but the present invention is not limited thereto. In the case where the aforementioned predetermined control temperature attainment time has been decided when the temperature is low enough, the predetermined control temperature attainment time may be defined to be somewhat longer than the duration during which the starting control temperature (e.g., about 250 ° C.) is reached from the beginning of starting of the fuel cell electricity generating system, i.e., not greater than about 1.2 times the aforementioned duration.

As a result, the fuel cell electricity generating system can be operated without causing troubles on electricity generation although taking more time to start than in normal operation. Further, the operator can use the fuel cell electricity generating system in the same way as in normal operation except that it takes slightly longer time to start operation until the defective parts (transformer heater) are replaced.

In this special operation mode operation, too, when the predetermined temperature is not reached within the limited time, abnormalities other than break of the transformer heater 43 were confirmed and displayed on the display portion 45 of the remote controller 44, which is a special operation mode switching unit, to make emergency suspension, making it possible to secure safety in a special operation mode.

Embodiment 2 of the Invention

The embodiment 2 of the present invention will be described in connection with FIG. 1. The constitution of the embodiment 2 of the present invention is the same as that of the embodiment 1 of the present invention.

Next, the operation and action will be described.

The operation of the fuel cell electricity generating system during starting in normal operation or electricity generation is the same as that of the embodiment 1 of the present invention.

Next, when the combustion fan suction temperature detecting unit 38, which is one of state detecting units, is out of order (break or short-circuit), the operation controlling unit 47 confirms the trouble (break or short-circuit) by the fact that the combustion fan suction temperature detecting unit 38 falls outside the normal temperature range during the beginning of starting of operation made by the remote controller 44 and then displays the abnormality on the display portion 45 of the remote controller 44, which is a special operation mode switching unit, to make emergency suspension.

Thereafter, by making a special operation (e.g., double depression of a plurality of switches on the operation portion 46 or continuous depression of these switches for a predetermined period of time or combination of these operations of depression of switches) on the remote controller 44, the operation mode is switched to a special operation mode for trouble (break or short-circuit) on the combustion fan suction temperature detecting unit 38. In other words, the operation mode is switched to the temperature correction by the temperature of raw material gas made by the gas temperature detecting unit 41 instead of the temperature correction (air density correction) of the amount of combustion air to be supplied into the heating unit 36 made by the detection signal from the combustion fan suction temperature detecting unit 38.

In the special operation mode for the trouble (break or short-circuit) on the combustion fan suction temperature detecting unit 38, the amount of combustion air to be supplied into the heating unit 36 is temperature-corrected (air density-corrected) as substitute detecting signal of the combustion fan suction temperature detecting unit 38 using the temperature calculated by adding some correction temperature (from few degrees to scores of degrees C.) to the temperature of raw material gas from the gas temperature detecting unit 41 on the previous assumption that the temperature of raw material gas detected by the gas temperature detecting unit 41 is somewhat lower (from few degrees to scores of degrees C.) than the temperature of combustion air to be supplied into the heating unit 36 represented by the detection signal from the combustion fan suction temperature detecting unit 38 inmost cases during starting and electricity generation The method of estimating the temperature of raw material gas will be described later.

As a result, since the temperature of raw material gas detected by the gas temperature detecting unit 41 is a temperature detection signal approximated by the temperature correction (air density correction) of the amount of combustion air in normal operation and having some relationship with season, installation site and operating time, the fuel cell electricity generating system can mostly be operated without any troubles during starting and electricity generation and used within the normal combustion characteristic range in the operation of heating by the heating unit 36 of the modifier 23 until the replacement of the defective parts (combustion fan suction temperature detecting unit 38).

Further, in this special operation mode operation, too, the heating unit 36 is provided with a safety device (combustion detecting unit, excess temperature rise detector, etc.: not shown). Therefore, if it should happen that this safety device operates, the heating unit 36 makes emergency suspension, making it possible to secure safety in the special operation mode.

The aforementioned embodiment of the present invention is arranged for the case where the combustion fan suction temperature detecting unit 38 is out of order (break or short-circuit). However, it goes without saying that when the gas temperature detecting unit 41 is out of order (break or short-circuit), the use of the combustion fan suction temperature detecting unit 38 in substitution for the gas temperature detecting unit 41 exerts the same effect. The method of estimating the temperature of raw material gas will be described later.

Detailed description will be made below on how one of the gas temperature detecting unit 41 and the combustion fan suction temperature detecting unit 39 which is out of order is substituted by the other which is in order.

Figure 2:
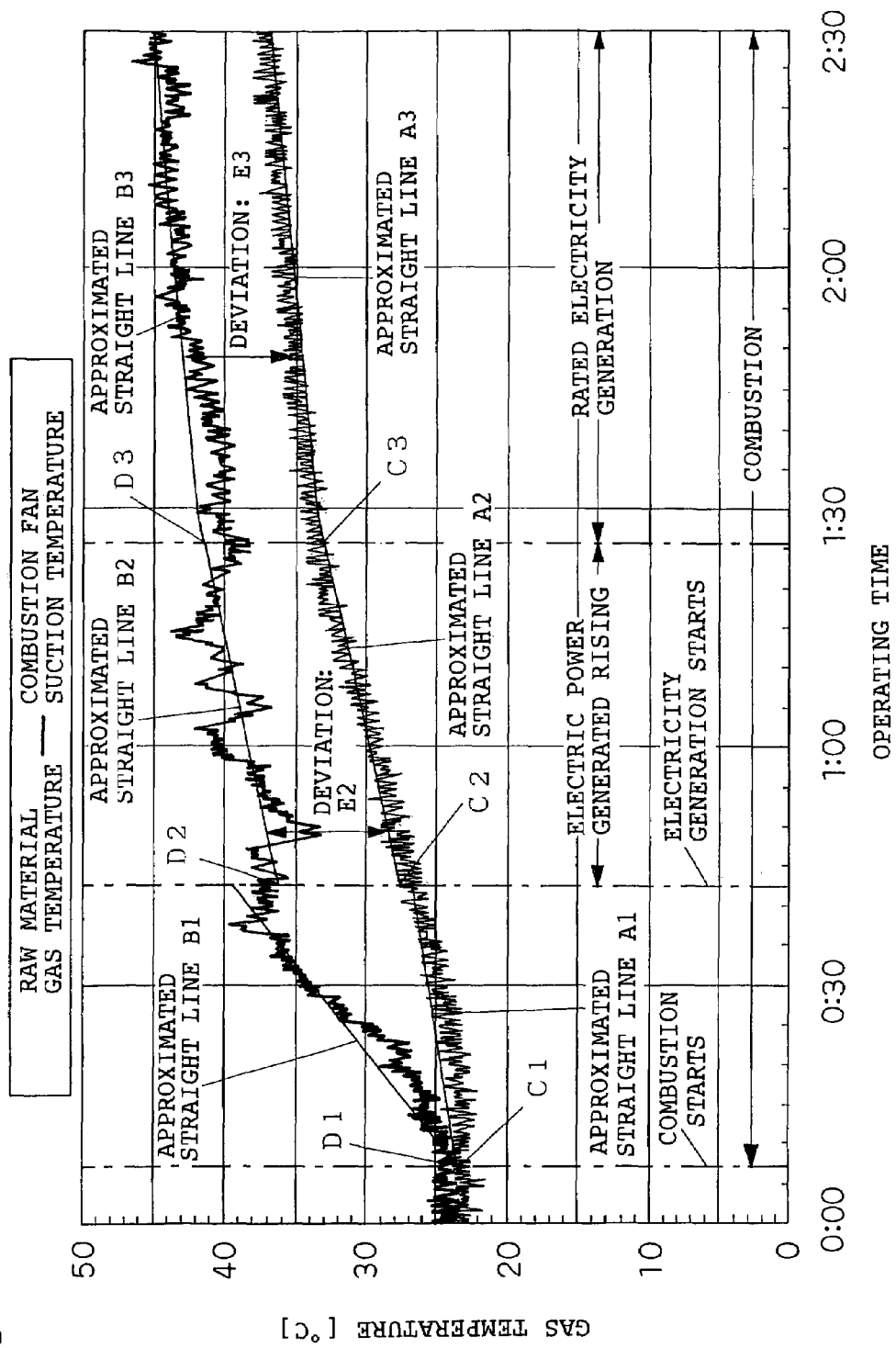
FIG. 2 is a diagram illustrating the relationship between the operation time of the fuel cell electricity generating system according to the embodiment 2 of the present invention and the temperature of raw material gas detected by the gas temperature detecting unit 41 and the combustion fan suction temperature detected by the combustion fan suction temperature detecting unit 38.

FIG. 2 illustrates the relationship between the operation time of the fuel cell electricity generating system and the temperature of raw material gas detected by the gas temperature detecting unit 41 and the combustion fan suction temperature detected by the combustion fan suction temperature detecting unit 38. FIG. 2 illustrates the temperature of raw material gas detected by the gas temperature detecting unit 41 and the combustion fan suction temperature detected by the combustion fan suction temperature detecting unit 38 during the period between the beginning of combustion and the beginning of electricity generation, the period between the beginning of electricity generation and rated electricity generation and the period after rated electricity generation. FIG. 2 also illustrates an approximated straight line of the temperature of raw material gas detected by the gas temperature detecting unit 41 and an approximated straight line of the combustion fan suction temperature detected by the combustion fan suction temperature detecting unit 38 during the respective period.

Firstly, during the period between the beginning of combustion and the beginning of electricity generation, the temperature of raw material gas is approximated by the approximated straight line A1 and the combustion fan suction temperature is approximated by the approximated straight line B1. In other words, the approximated straight line A1 and the approximated straight line B1 are represented by the following equations 1 and 2, respectively:

$$A1 = a1 \times T + C1 \quad \text{(Equation 1)}$$

$$B1 = b1 \times T + D1 \quad \text{(Equation 2)}$$

In these equations, a1 is the gradient of the approximated straight line A1, and C1 is the temperature of raw material gas during the beginning of combustion in the heating unit 36 of the fuel cell electricity generating system. Further, b1 is the gradient of the approximated straight line B1, and D1 is the combustion fan suction temperature during the beginning of combustion in the heating unit 36 of the fuel cell electricity generating system. Moreover, T is the time elapsed from the beginning of combustion in the heating unit 36 of the fuel cell electricity generating system. Further, C1 is equal to D1. In other words, the temperature of raw material gas is equal to the combustion fan suction temperature when the heating unit 36 of the fuel cell electricity generating system begins combustion.

In the special operation mode for the case where the combustion gas suction temperature detecting unit 38 is out of order, the temperature of raw material gas is detected by the gas temperature detecting unit 41. Then, using the value obtained by adding to the raw material gas temperature thus detected the value obtained by subtracting Equation 1 from Equation 2 at the time T, i.e., (B1−A1), the amount of combustion air to be supplied into the heating unit 36 is temperature-corrected (air density-corrected) as substitute detection signal for the combustion fan suction temperature detecting unit 38.

On the contrary, in the special operation mode for the case where the gas temperature detecting unit 41 is out of order, the combustion fan suction temperature is detected by the combustion gas suction temperature detecting unit 38. Then, using the value obtained by adding to the combustion fan-suction temperature thus detected the value obtained by subtracting Equation 2 from Equation 1 at the time T, i.e., (A1−B1), the amount of the raw material gas to be supplied through the raw material gas supply valve is temperature-corrected as substitute detection signal for the gas temperature detecting unit 41.

Next, during the period between the beginning of electricity generation and the rated electricity generation, the temperature of raw material gas is approximated by the approximated straight line A2 and the combustion fan suction temperature is approximated by the approximated straight line B2. In other words, the approximated straight line A2 and the approximated straight line B2 are represented by the following equations 3 and 4, respectively:

$$A2 = a2 \times T + C2 \quad \text{(Equation 3)}$$

$$B2 = b2 \times T + D2 \quad \text{(Equation 4)}$$

In these equations, a2 is the gradient of the approximated straight line A2, and C2 is the temperature of the raw material gas during the beginning of electricity generation. Further, b2 is the gradient of the approximated straight line B2, and D2 is the combustion fan suction temperature during the beginning of electricity generation. Further, T is the time elapsed from the beginning of electricity generation. Moreover, a2 and b2 are substantially equal to each other.

In the special operation mode where the combustion gas suction temperature detecting unit 38 is out of order, the temperature of the raw material gas is detected by the gas temperature detecting unit 41. Then, using the value obtained by adding to the raw material gas temperature thus detected the predetermined deviation (fixed value) E2 of A2 and B2, the amount of combustion air to be supplied into the heating unit 36 is temperature-corrected (air density-corrected) as substitute detection signal for the combustion fan suction temperature detecting unit 38.

On the contrary, in the special operation mode for the case where the gas temperature detecting unit 41 is out of order, the combustion fan suction temperature is detected by the combustion gas suction temperature detecting unit 38. Then, using the value obtained by subtracting from the combustion fan suction temperature thus detected the predetermined deviation (fixed value) E2 of A2 and B2, the amount of the raw material gas to be supplied through the raw material gas supply valve is temperature-corrected as substitute detection signal for the gas temperature detecting unit 41.

Next, during the period after rated electricity generation, the temperature of the raw material gas is approximated by the approximated straight line A3 and the combustion fan suction temperature is approximated by the approximated straight line B3. In other words, the approximated straight line A3 and the approximated straight line B3 are represented by the following equations 5 and 6, respectively:

$$A3 = a3 \times T + C3 \quad \text{(Equation 5)}$$

$$B3 = b3 \times T + D3 \quad \text{(Equation 6)}$$

In these equations, a3 is the gradient of the approximated straight line A3, and C3 is the temperature of the raw material gas during the beginning of rated electricity generation. Further, b3 is the gradient of the approximated straight line B3, and D3 is the combustion fan suction temperature during the beginning of rated electricity generation. Further, T is the time elapsed from the beginning of rated electricity generation in the fuel cell electricity generation system. Moreover, a3 and b3 are substantially equal to each other.

In the special operation mode where the combustion gas suction temperature detecting unit 38 is out of order, the temperature of the raw material gas is detected by the gas temperature detecting unit 41. Then, using the value obtained by adding to the raw material gas temperature thus detected the predetermined deviation (fixed value) E3 of A3 and B3, the amount of combustion air to be supplied into the heating unit 36 is temperature-corrected (air density-corrected) as substitute detection signal for the combustion fan suction temperature detecting unit 38.

On the contrary, in the special operation mode for the case where the gas temperature detecting unit 41 is out of order, the combustion fan suction temperature is detected by the combustion gas suction temperature detecting unit 38. Then, using the value obtained by subtracting from the combustion fan suction temperature thus detected the predetermined deviation (fixed value) E3 of A3 and B3, the amount of the raw material gas to be supplied through the raw material gas supply valve is temperature-corrected as substitute detection signal for the gas temperature detecting unit 41.

Thus, in the special operation mode for the case where the combustion gas suction temperature detecting unit 38 or the gas temperature detecting unit 41 is out of order, the detected temperature of the unit out of order is estimated by making the use of the approximated straight line of the raw material gas temperature detected by the gas temperature detecting unit 41 and the approximated straight line of the combustion fan suction temperature detected by the combustion fan suction temperature detecting unit 38. The detected temperature thus estimated can then be used for control, making it possible to substitute for the unit out of order.

Embodiment 3 of the Invention

Figure 3:
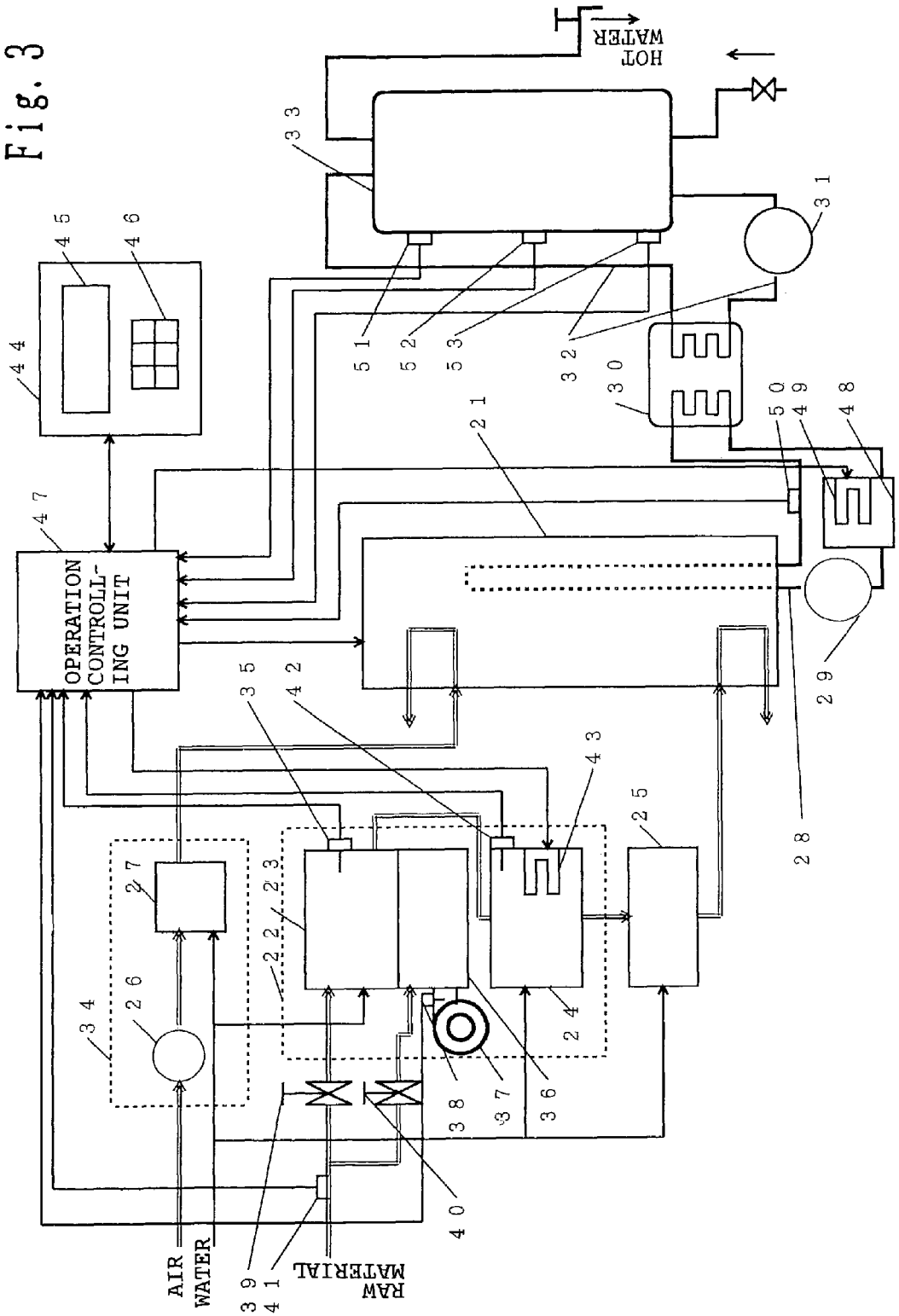
FIG. 3 is a block diagram of the fuel cell electricity generating system according to the embodiment 3 of the present invention.

FIG. 3 is a block diagram of the fuel cell electricity generating system according to the embodiment 3 of the present invention.

In FIG. 3, where the parts function in the same way as those of the related art fuel cell electricity generating system shown in FIG. 6 and the fuel cell electricity generating system according to the embodiment 1 of the present invention shown in FIG. 1, the same numbers are used and detailed description of their function will be omitted because they are similar to those of FIGS. 1 and 6.

The reference numeral 48 indicates a cooling water tank of heating the cooling water in the fuel cell 21 in the path of the cooling pipe 28, the reference numeral 49 indicates a cooling water heater provided in the cooling water tank 48, and the reference numeral 50 indicates a cooling water temperature detecting unit of detecting the temperature of cooling water in the cooling pipe 28 which is connected so as to output a temperature detection signal to the operation controlling unit 47 and apply a heater output signal to the cooling water heater 49.

Further, the hot water storage tank 33 has hot water storage tank temperature detecting units 51, 52 and 53 of detecting the temperature of hot water stored in the tank provided at the upper portion, middle portion and lower portion thereof, respectively.

Next, the operation and action will be described.

When the fuel cell electricity generating system is started, the operation controlling unit 47 heats the cooling water via the cooling water heater provided in the cooling water tank 48 in the path of the cooling pipe 28 to reach a temperature range suitable for electricity generation reaction while causing the cooling water temperature detecting unit 50 to detect the temperature of cooling water.

Further, during electricity generation, waste heat generated by the electricity generation by the fuel cell 21 is circulated via a pump 29 in the form of cooling water which is then heat-exchanged with water flowing through a waste heat collecting pipe 32 by a heat exchanger 30. The water thus heated is then collected by the hot water storage tank 13 via a circulating pump 31.

Next, in the case where the cooling water heater 49 is out of order (break), the operation controlling unit 47 detects by the cooling water temperature detecting unit 50 that although the operation controlling unit 47 outputs and drives the cooling water heater 49 during starting, the temperature of cooling water doesn't rise. When the predetermined temperature is not reached in a predetermined period of time, the break of the cooling water heater 49 is confirmed and displayed as abnormality in the display portion 45 of the remote controller 44, which is a special operation mode switching unit, to make emergency suspension.

Thereafter, by making a special operation (e.g., double depression of a plurality of switches on the operation portion 46 or continuous depression of these switches for a predetermined period of time or combination of these operations of depression of switches) on the remote controller 44, the operation mode is switched to a special operation mode for the break of the cooling water heater 49. In other words, the operation mode is switched to an operation sequence for the absence of temperature rise by the cooling water heater 49.

In the special operation mode for the break of the cooling water heater 49, since there is provided no heating unit in the path of the cooling water pipe 28, the cooling water is heated by the making the use of the heat of hot water stored in the hot water storage tank 33 during starting. In other words, by causing the hot water tank temperature detecting units 51, 52 and 53 to detect the state of storage of hot water in the hot water storage tank 33 and, if the amount of hot water stored in the hot water storage tank 33 is not smaller than a predetermined value, driving the circulating pump 31 and the cooling water pump 29 to make heat transfer opposite the transfer of heat in the collection of waste heat during normal electricity generation, the temperature of the cooling water is raised.

As a result, the fuel cell electricity generating system can be operated without causing troubles on electricity generation, though taking more time to start than in normal operation. Further, the operator can use the fuel cell electricity generating system in the same way as in normal operation except that it takes slightly longer time to start operation until the defective parts (cooling water heater) are replaced.

In this special operation mode operation, too, when the predetermined temperature is not reached within the limited time, abnormalities other than break of the cooling water heater 49 were confirmed and displayed on the display portion 45 of the remote controller 44, which is a special operation mode switching unit, to make emergency suspension, making it possible to secure safety in a special operation mode.

Further, since the cooling water tank 48 is provided with a safety device (excess temperature rise detector, etc.: not shown), the cooling water tank 48 makes emergency suspension if it should happen that this safety device operates, making it possible to secure double safety in the special operation mode.

Embodiment 4 of the Invention

Figure 4:
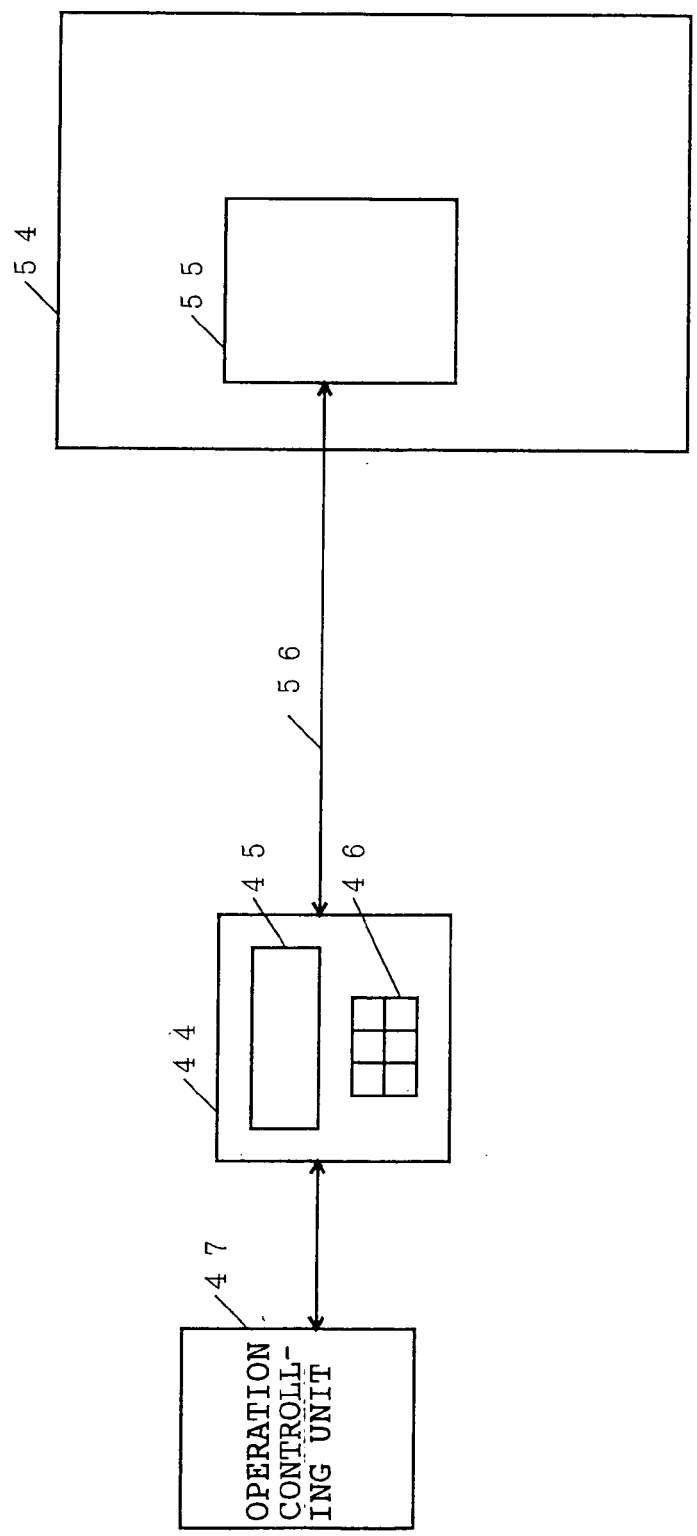
FIG. 4 is a block diagram of the fuel cell electricity generating system according to the embodiment 4 of the present invention.
Figure 5:
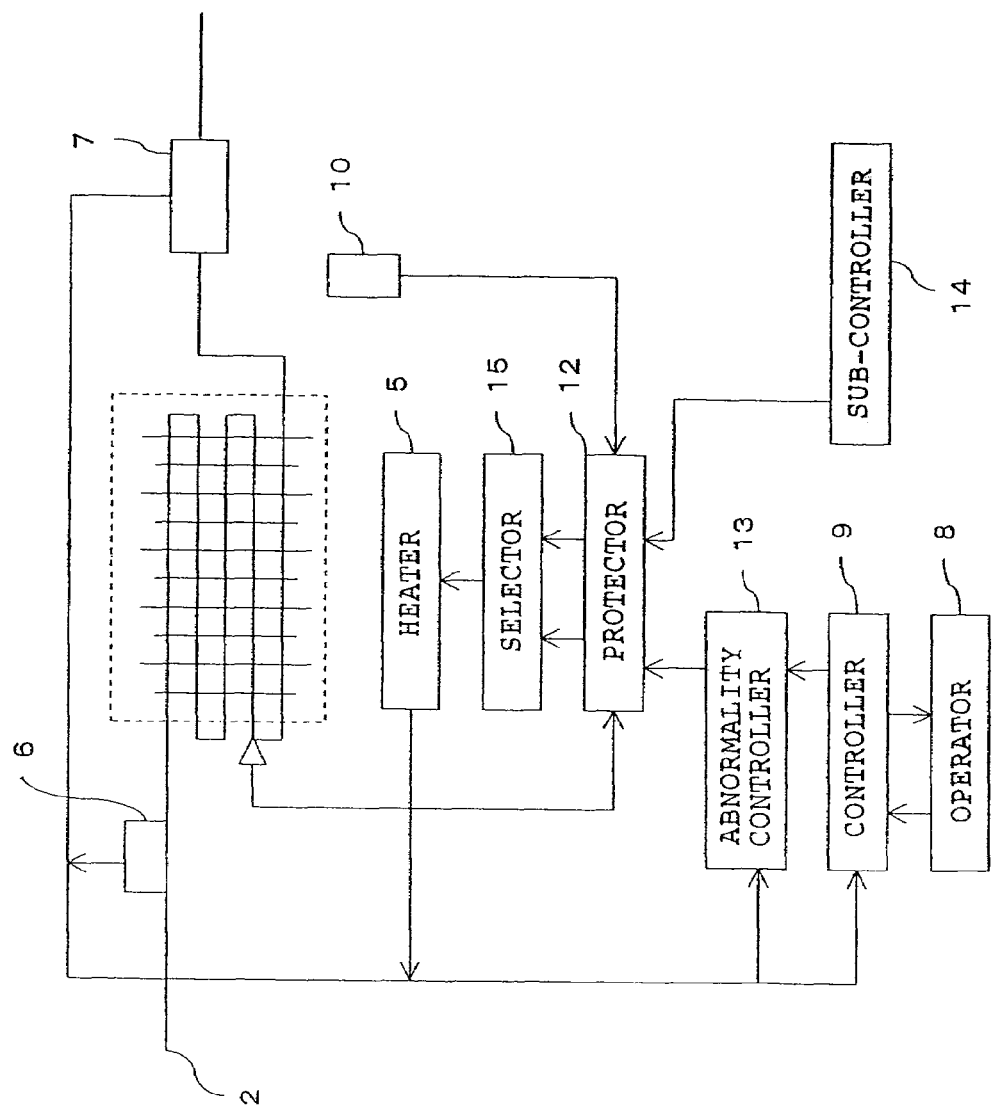
FIG. 5 is a block diagram of the fuel cell electricity generating system according to the related art example 1.

FIG. 4 is a block diagram of the fuel cell electricity generating system according to the embodiment 4 of the present invention.

In FIG. 4, where the parts function in the same way as those of the related art fuel cell electricity generating system shown in FIG. 6 and the fuel cell electricity generating systems according to the embodiments 1, 2 and 3 of the present invention shown in FIGS. 1 and 2, the same numbers are used and detailed description of their function will be omitted because they are similar to those of FIGS. 1, 2 and 6.

The reference numeral 54 indicates an outdoor maintenance company, the reference numeral 55 indicates a maintenance communications device for fuel cell electricity generating system in the outdoor maintenance company, and the reference numeral 56 indicates a communication line which is connected to the operation controlling unit 47 of the fuel cell electricity generating system.

Next, the operation and action will be described.

During normal operation of the fuel cell electricity generating system, the operation controlling unit 47 transmits maintenance data (e.g., cumulative time of use of filter expendables) among operation data to the maintenance communications device 55 for fuel cell electricity generating system in the outdoor maintenance company 54 via the remote controller 44 as necessary.

The outdoor maintenance company 54 always monitors and controls maintenance data for clients' fuel cell electricity generating system and informs the clients of the time when maintenance parts should be replaced. Alternatively, the outdoor maintenance company 54 displays it on the display portion 45 of the remote controller 44 via the communication line 56.

Next, in the case where the state detecting unit itself or predetermined functions of various units are out of order, the operation controlling unit 47 transmits the contents of troubles to the maintenance communications device 55 for fuel cell electricity generating system in the outdoor maintenance company 54 as emergency maintenance data via the remote controller 44 as in normal operation.

Upon the reception of emergency maintenance data for clients' fuel cell electricity generating system, the outdoor maintenance company 54 analyzes the contents of troubles (abnormalities) and, if these troubles (abnormalities) can be coped with the special operation modes described in the embodiments 1, 2 and 3 of the invention, transmits the special operation program according to the contents of troubles to the remote controller 47 of the clients' fuel cell electricity generating system via the communication line 56. The outdoor maintenance company 54 then asks the clients to reoperate their fuel cell electricity generating system in the special operation mode thus transmitted.

Accordingly, emergency service can be conducted without dispatching servicemen to the clients' home. Once parts are available according to the contents of troubles, these troubles (abnormalities) can be solved at one time of visit to the clients' home.

Of course, in this special operation mode, too, abnormalities other than the aforementioned troubles are monitored as in the aforementioned other embodiments of the invention before reoperation, making it possible to secure safety in the special operation mode.

Further, since a safety device (excess temperature rise detector, etc.: not shown) is provided, the fuel cell electricity generating system makes emergency suspension if it should happen that this safety device operates, making it possible to secure double safety in the special operation mode.

While the aforementioned embodiment of the invention is arranged such that data are transmitted from the remote controller 44 to the maintenance communications device 55 for fuel cell electricity generating system in the outdoor maintenance company 54 via the communication line 56, it goes without saying that the same effect can be exerted also by arranging such that the operation controlling unit 47 is capable of communicating to transmit data directly to the maintenance communications device 55 for fuel cell electricity generating system in the outdoor maintenance company 54.

The outdoor maintenance company 54 according to the present mode for carrying out the invention is an example of the outdoor maintenance controlling unit of the present invention.

As can be seen in the foregoing description, the fuel cell electricity generating system and fuel cell electricity generating system controlling method of the present invention can provide the following effects.

The fuel cell electricity generating system of the present invention can be reoperated in a special operation mode targeting not only abnormalities/troubles on the state detecting unit of the fuel cell electricity generating system but also abnormalities/troubles of actuator, etc., making it possible to cope with a wide range of abnormalities/troubles and make safety operation without giving any inconvenience such as suspension of use of equipment to the user.

Since the switching unit of the special operation mode can be switched by operating a simple switching unit as in special operation on remote controller, a fuel cell electricity generating system capable of quickly coping with abnormalities can be provided.

In the case of troubles (abnormalities) that can be coped with in a special operation mode, a special operation program can be transmitted from an outdoor maintenance company to the clients' fuel cell electricity generating system via a communication line to enable tentative operation of the fuel cell electricity generating system, making it possible to make emergency service without dispatching servicemen to the clients' home. Once parts are available according to the contents of troubles, these troubles (abnormalities) can be solved at one time of visit to the clients' home.

The invention claimed is:

1. A fuel cell electricity generating system, comprising:
   a fuel cell configured to allow the reaction of a fuel gas with an oxidizer gas to generate electricity,
   a fuel gas supplying unit configured to supply the fuel gas into said fuel cell,
   an oxidizer gas supplying unit configured to supply the oxidizer gas into said fuel cell,
   a state detecting unit configured to detect the temperature of cooling water to be supplied into said fuel cell,
   a cooling water heater configured to heat the cooling water to said fuel cell,
   an operation controlling unit configured to detect abnormalities with respect to rising of the temperature of the cooling water by utilizing the results detected by said state detecting unit,
   a cooling water path in which the cooling water for cooling said fuel cell flows,
   a heat exchanger which is provided on said cooling water path,
   an exhaust heat recovery path in which flow a water of heat exchanging with the cooling water of said cooling water path via said heat exchanger,
   a hot water storage tank configured to store hot water of said exhaust heat recovery path, the hot water being heated by heat transfer from the cooling water via said heat exchanger during electricity generation, and
   an operation mode switching unit configured to switch an operation mode to heat the cooling water by heat transfer from the hot water of said exhaust heat recovery path via said heat exchanger, wherein in the switched operation mode the direction of heat transfer is an opposite direction during the electricity generation.

2. The fuel cell electricity generating system according to claim 1, wherein said operation mode switching unit performs switching operation by remote-controlled switches in a switching operation which is different from normal operation.

3. The fuel cell electricity generating system according to claim 1, wherein said operation mode switching unit performs remote-controlled switching so that the fuel cell electricity generating system is operated according to an operation program corresponding to the contents of abnormalities transmitted by an outdoor maintenance controlling unit via a communications unit.

4. The fuel cell electricity generating system according to claim 1, wherein
   the abnormality is the case that the temperature of said cooling water does not reach the predetermined temperature within the predetermined period of time during the starting of said fuel cell electricity generating system.

5. The fuel cell electricity generating system according to claim 1, wherein
   the abnormality is the case that the temperature of said cooling water raises at a slower rate than that in the normal starting of said fuel cell electricity generating system.

6. The fuel cell electricity generating system according to claim 1, wherein
   the abnormality is the case that the temperature of said cooling water does not reach the temperature range for power generation reaction of said fuel cell during the starting of said fuel cell electricity generating system.

7. A fuel cell electricity generating system controlling method of controlling a fuel cell electricity generating system comprising a fuel cell configured to allow the reaction of a fuel gas with an oxidizer gas to generate electricity, a fuel gas supplying unit configured to supply the fuel gas into said fuel cell, an oxidizer gas supplying unit configured to supply the oxidizer gas into said fuel cell, a cooling water heater configured to heat the cooling water to said fuel cell, a cooling water path in which the cooling water of cooling said fuel cell flows, a heat exchanger which is provided on said cooling water path, an exhaust heat recovery oath in which flow a water of heat exchanging with the cooling water of said cooling water path via said heat exchanger, and a hot water storage tank configured to store hot water of said exhaust heat recovery path, the hot water being heated by heat transfer from the cooling water via said heat exchanger during electricity generation, which comprises:

a state detecting step of detecting the temperature of said fuel cell;

an operation controlling step of detecting abnormalities of said state detecting step itself utilizing the results detected at the state detecting step and performing operation control in an operation mode corresponding to the contents of abnormalities; and an operation mode switching step of switching to said operation mode to heat the cooling water by heat transfer from the hot water of said exhaust heat recovery path via said heat exchanger, wherein in the switched operation mode the direction of heat transfer is an opposite direction during the electricity generation.

* * * * *